(12) United States Patent
Ozawa

(10) Patent No.: US 9,977,318 B2
(45) Date of Patent: May 22, 2018

(54) PROJECTOR AND METHOD FOR CONTROLLING PROJECTOR

(71) Applicant: Seiko Epson Corporation, Tokyo (JP)

(72) Inventor: Takaaki Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/408,765

(22) Filed: Jan. 18, 2017

(65) Prior Publication Data
US 2017/0205698 A1    Jul. 20, 2017

(30) Foreign Application Priority Data

Jan. 20, 2016    (JP) ................. 2016-008510

(51) Int. Cl.
G03B 21/20    (2006.01)
G03B 21/00    (2006.01)

(52) U.S. Cl.
CPC ....... G03B 21/2053 (2013.01); G03B 21/005 (2013.01)

(58) Field of Classification Search
CPC ............. G03B 21/145; G03B 21/206; G03B 21/2026; G03B 21/2053; H04N 9/3141; H04N 9/3155; H04N 9/3197; G09G 2360/04; G09G 2360/021; G09G 2360/0626
See application file for complete search history.

(56) References Cited

U.S. PATENT DOCUMENTS

| | | | | |
|---|---|---|---|---|
| 5,386,577 A | * | 1/1995 | Zenda ................... | G06F 1/3218 315/169.3 |
| 2002/0101201 A1 | * | 8/2002 | Furukawa ............ | H05B 41/042 315/307 |
| 2004/0227902 A1 | * | 11/2004 | Kimura .................. | G03B 21/10 353/74 |
| 2008/0012997 A1 | * | 1/2008 | Reuter ................. | H04N 9/3111 348/771 |
| 2012/0319599 A1 | * | 12/2012 | Suzuki ............... | H05B 41/2858 315/175 |

FOREIGN PATENT DOCUMENTS

| | | |
|---|---|---|
| JP | 2008-191359 | 8/2008 |
| JP | 2013-120258 A | 6/2013 |

* cited by examiner

*Primary Examiner* — Sultan Chowdhury
(74) *Attorney, Agent, or Firm* — ALG Intellectual Property, LLC

(57) ABSTRACT

A projector includes a light source section that outputs first light, a power supply section that generates electric power in both a case where the power supply section is connected to a commercial AC power supply having first power supply voltage and a case where the power supply section is connected to a commercial AC power supply having second power supply voltage lower than the first power supply voltage, a light source drive section that controls the amount of first light, and a control section that allows execution of a function of controlling the amount of first light in the case where the power supply section is connected to the commercial AC power supply having first power supply voltage and restricts the execution of the function in the case where the power supply section is connected to the commercial AC power supply having second power supply voltage.

5 Claims, 4 Drawing Sheets

PROJECTOR AND METHOD FOR CONTROLLING PROJECTOR

CROSS-REFERENCE

The entire disclosure of Japanese Patent Application No. 2016-008510, filed Jan. 20, 2016 is expressly incorporated by reference herein.

BACKGROUND

1. Technical Field

The present invention relates to a projector and a method for controlling the projector.

2. Related Art

There is a known technology that allows a projector driven at 200 V to driven at 100 V (see JP-A-2013-120258, for example). JP-A-2013-120258 discloses a projector configured in such a way that in a case where the projector is connected to a 100-V commercial power supply, the projector is driven at 100 V in a state in which the number of lamps to be turned on is reduced or the output from each of the lamps is reduced.

In general, a projector has the function of controlling the amount of outputted light. The function and similar functions are affected by supplied electric power. However, no proposal has been made on execution of the function in a case where the supplied power supply voltage differs from the intended power supply voltage, as in the projector described in JP-A-2013-120258.

SUMMARY

An advantage of some aspects of the invention is to allow the function of controlling the amount of outputted light to be executed in accordance with the state of the power supply.

An aspect of the invention is directed to a projector including a projection section that includes a light source section that outputs first light and a light modulation section that outputs second light that is the first light modulated in accordance with image information, the projection section projecting the second light on a projection surface, a power supply section that generates electric power that drives the projector and generates the electric power in both a case where the power supply section is connected to a first power supply having first power supply voltage and a case where the power supply section is connected to a second power supply having second power supply voltage lower than the first power supply voltage, a light source drive section that controls an amount of the first light outputted from the light source section, and a control section that allows execution of a function of controlling the amount of the first light from the light source section in the case where the power supply section is connected to the first power supply and restricts the execution of the function in the case where the power supply section is connected to the second power supply.

According to the configuration described above, since the amount of light is controlled differently in the case where the power supply section is connected to the first power supply and the case where the power supply section is connected to the second power supply having lower power supply voltage, the function of controlling the amount of outputted light can be executed in accordance with the state of the power supply to which the power supply section is connected.

In the projector according to the aspect of the invention, the control section may cause the projection section to project a displayed content indicating that selection of the function is not accepted in the case where the power supply section is connected to the second power supply.

According to the configuration described above, since a displayed content indicating that selection of the function of controlling the amount of outputted light is not accepted is projected, a user can be notified that the function cannot be selected.

In the projector according to the aspect of the invention, the control section may cause the projection section to project information representing that selection of the function is not accepted for a predetermined period after the projection section starts projection.

According to the configuration described above, since the information representing that selection of the function of controlling the amount of outputted light is not accepted is projected for a predetermined period after projection starts, the user can be notified that the function cannot be selected.

In the projector according to the aspect of the invention, the control section may cause the projection section to project a menu screen for operation of specifying whether or not the function is allowed to be executed, and in the case where the power supply section is connected to the second power supply, the control section may not accept the operation that is performed on the menu screen and specifies whether or not the function is allowed to be executed.

According to the configuration described above, since the operation that is performed on the menu screen and specifies whether or not the function is allowed to be executed is not accepted, a problematic situation in which the amount of outputted light cannot be controlled when the user instructs execution of the function can be avoided.

In the projector according to the aspect of the invention, the light source drive section may use the function to control the amount of the first light to be the amount in a first state or the amount in a second state different from the first state, control the amount of the first light to be the amount in the first state or the second state set by operation performed on the menu screen in the case where the power supply section is connected to the first power supply, and control the amount of the first light to be the amount in the second state in the case where the power supply section is connected to the second power supply.

According to the configuration described above, in the case where the power supply section is connected to the first power supply, the amount of the first light is controlled to be the amount in the first state or the second state, and in the case where the power supply section is connected to the second power supply, the amount of the first light is controlled to the amount in the second state. The function of controlling the amount of outputted light can therefore be executed in accordance with the power supply to which the power supply section is connected.

Another aspect of the invention is directed to a method for controlling a projector including a projection section that includes a light source section that outputs first light and a light modulation section that outputs second light that is the first light modulated in accordance with image information, the projection section projecting the second light on a projection surface, and a power supply section that generates electric power that drives the projector and generates the electric power in both a case where the power supply section is connected to a first power supply having first power supply voltage and a case where the power supply section is connected to a second power supply having second power supply voltage lower than the first power supply voltage, the method including controlling an amount of the first light outputted from the light source section and allowing execution of a function of controlling the amount of the first light from the light source section in the case where the power supply section is connected to the first power supply and restricting the execution of the function in the case where the power supply section is connected to the second power supply.

According to the configuration described above, since the amount of light is controlled differently in the case where the power supply section is connected to the first power supply and the case where the power supply section is connected to the second power supply having lower power supply voltage, the function of controlling the amount of outputted light can be executed in accordance with the state of the power supply to which the power supply section is connected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
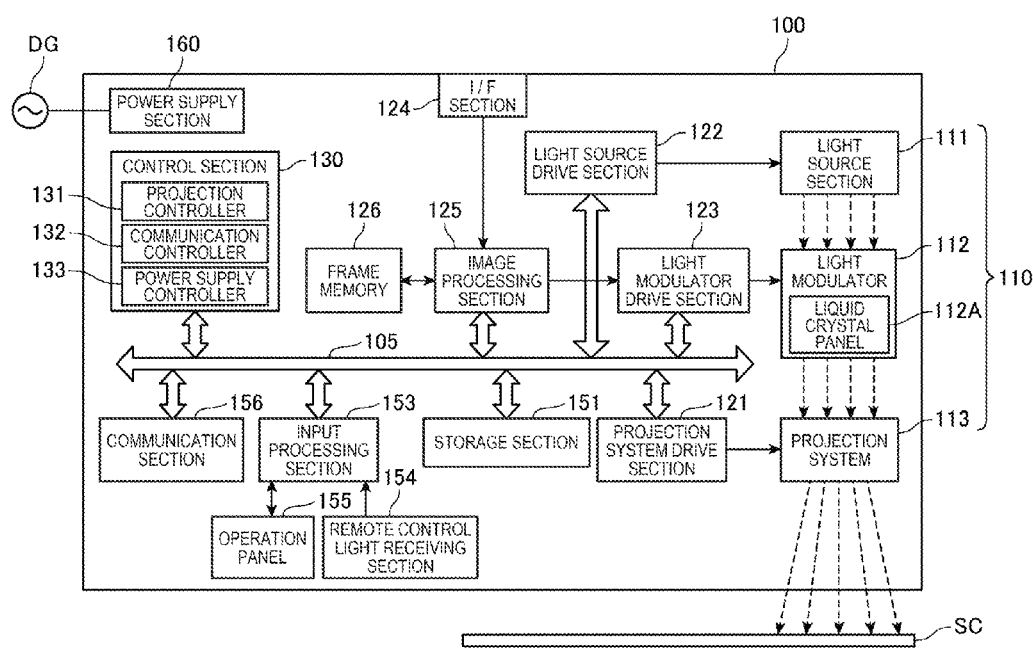
FIG. 1 is a block diagram showing the configuration of a projector.

FIG. 1 is a block diagram showing the configuration of a projector 100.

The projector 100 projects image light on a projection target to form an image based on image data (image information) on the surface of the projection target. The projection target on which the projector 100 projects an image may be a flat surface, a curved surface, or an irregular surface. An embodiment of the invention will be described with reference to a case where an image is projected on a screen SC (projection surface) formed of a flat surface. The screen SC may be a fixed flat surface, such as a wall surface, or may be a hanging or standing curtain-shaped screen. The projector 100 is provided with a projection opening (not shown) through which the image light is projected. The projection opening is an opening through which a projection system 113 built in the projector 100 radiates light.

The projector 100 includes an interface section (hereinafter abbreviated to I/F section) 124, as shown in FIG. 1. The I/F section 124 can be formed, for example, of a DVI interface, a USB interface, or a LAN interface, to which a digital video signal is inputted. The I/F section 124 can instead be formed, for example, of an S video terminal, to which a composite video signal that complies with NTSC, PAL, SECAM, or any other standard is inputted, an RCA terminal, to which a composite video signal is inputted, or a D terminal, to which a component video signal is inputted. The I/F section 124 can still instead be formed of a general-purpose interface, such as an HDMI connector, which complies with the HDMI (registered trademark) standard.

The projector 100 includes the following broadly classified portions: a projection section 110, which forms an optical image; and an image processing system that electrically processes an image signal inputted to the projection section 110.

The projection section 110 includes a light source section 111, a light modulator 112 (light modulation section) including a liquid crystal panel 112A, and a projection system 113.

The light source section 111 includes a light source formed, for example, of a xenon lamp, an ultrahigh-pressure mercury lamp, an LED (light emitting diode), or a laser. The light source section 111 outputs first light emitted from the light source to the light modulator 112. The light source section 111 may include a reflector and an auxiliary reflector that guide the first light emitted from the light source to the light modulator 112. The light source section 111 may still further include a lens group for enhancing the optical characteristics of projected light, a polarizer, a light control element that is located in the path to the light modulator 112 and attenuates the amount of light emitted from the light source, and other components (none of them is shown).

The light modulator 112, for example, includes a transmissive liquid crystal panel 112A, and the liquid crystal panel 112A receives a signal from the image processing system, which will be described later, and forms an image on the basis of the received signal. In this case, the light modulator 112 includes three liquid crystal panels 112A corresponding to the three primary colors RGB for color image projection. The first light from the light source section 111 is separated into light fluxes of the three colors RGB, and each of the color light fluxes is incident on the corresponding liquid crystal panel 112A. The color light fluxes having passed through the liquid crystal panels 112A and having been modulated therein are combined with one another by a light combining system, such as a cross dichroic prism, and the combined light exits out of the light combining system toward the projection system 113. That is, the light modulator 112 modulates the first light emitted from the light source and outputs second light that is the first light having undergone the modulation to the projection system 113.

The light modulator 112 does not necessarily have the configuration using three transmissive liquid crystal panels 112A and can be formed, for example, of three reflective liquid crystal panels. The light modulator 112 may instead be formed, for example, of a combination of a single liquid crystal panel and a color wheel. In the case where only one liquid crystal panel 112A or a DMD (digital mirror device) is used as the light modulator 112, a member corresponding to the light combining system, such as a cross dichroic prism, is not required. In place of the liquid crystal panels 112A or a DMD, any configuration capable of modulating the first light outputted from the light source section 111 can be employed.

The projection system 113 receives the modulated incident light (second light) from the light modulator 112, and a projection lens in the projection system 113 radiates the incident light outward through the projection opening (not shown) and forms a projected image on the screen SC.

A projection system drive section 121 and a light source drive section 122 are connected to the projection section 110. The projection system drive section 121 drives each motor provided in the projection system 113 under the control of a control section 130, which will be described later.

The light source drive section 122 drives the light source provided in the light source section 111 under the control of the control section 130. Further, the light source drive section 122 controls the amount of first light outputted from the light source section 111 to the light modulator 112 under the control of the control section 130. For example, in a case where the light source section 111 includes a plurality of LED arrays each of which is formed of a plurality of arranged LEDs, the light source drive section 122 controls the number of LED arrays to be turned on and controls the output from each of the LED arrays to control the amount of first light. Further, for example, in a case where the light source section 111 is formed of a lamp, the light source drive section 122 controls the voltage outputted to the lamp to control the amount of first light.

The projection system drive section 121 and the light source drive section 122 are connected to a bus 105.

The projector 100 includes a communication section 156. The communication section 156 is connected to the bus 105. The communication section 156 communicates with an external apparatus in accordance with a communication standard under the control of the control section 130.

The image processing system provided in the projector 100 is primarily formed of the control section 130, which synthetically controls the entire projector 100, and further includes a storage section 151, an image processing section 125, a light modulator drive section 123, and an input processing section 153. The control section 130, the storage section 151, the input processing section 153, the image processing section 125, and the light modulator drive section 123 are connected to the bus 105.

The control section 130 includes a CPU (central processing unit), a ROM (read only memory), a RAM (random access memory), and other components (none of them is shown), and the CPU executes a control program stored in the ROM to control the projector 100. Further, the control section 130 reads and executes a control program stored in the storage section 151 to function as a projection controller 131, a communication controller 132, and a power supply controller 133, which will be described later.

The storage section 151 is formed of a nonvolatile memory, such as a flash memory and an EEPROM (electrically erasable programmable read-only memory) and stores a variety of data in a rewritable, nonvolatile manner. The storage section 151 stores the control program used to control the projector 100, image data, and other pieces of information.

The image processing section 125 carries out, for example, a resolution conversion process of converting image data inputted through the I/F section 124 into data having resolution suitable for the specifications of the liquid crystal panels 112A of the light modulator 112. The image processing section 125 draws in a frame memory 126 a display image to be displayed by the light modulator 112 and outputs the drawn display image to the light modulator drive section 123. The light modulator drive section 123 drives the light modulator 112 on the basis of the display image inputted from the image processing section 125. As a result, the image is drawn in each of the liquid crystal panels 112A of the light modulator 112, and the drawn images are projected as a projection image on the screen SC via the projection system 113.

The projector 100 includes an operation panel 155 having a variety of switches operated by a user and an indicator lamp. The operation panel 155 is connected to the input processing section 153. The input processing section 153 turns on the indicator lamp or causes the indicator lamp to blink as appropriate in accordance with the action state and the setting state of the projector 100 under the control of the control section 130. When any of the switches on the operation panel 155 is operated, an operation signal corresponding to the operated switch is outputted from the input processing section 153 to the control section 130.

The projector 100 further includes a remote control (not shown) used by the user. The remote control has a variety of buttons and transmits an infrared signal in correspondence with operation of any of the buttons. The projector 100 includes a remote control light receiving section 154, which receives the infrared signal issued from the remote control. The remote control light receiving section 154 decodes the infrared signal received from the remote control to generate an operation signal representing the content of the operation performed on the remote control and outputs the operation signal to the control section 130.

A power supply section 160 is connected to a commercial AC power supply DG via a cable and generates electric power that drives the projector 100 on the basis of electric power supplied from the commercial AC power supply DG. The power supply section 160 supplies the portions that form the projector 100 with the generated electric power. In the present embodiment, the power supply section 160 is connected to a commercial AC power supply DG that supplies a voltage of 200 V (first power supply voltage) in some cases and a commercial AC power supply DG that supplies a voltage of 100 V (second power supply voltage) in other cases, and the power supply section 160 generates the electric power that drives the projector 100 irrespective of the voltage of the connected commercial AC power supply DG, 220 V or 100 V. The 200-V commercial AC power supply DG corresponds to a first power supply, and the 100-V commercial AC power supply DG corresponds to a second power supply.

The projection controller 131, the communication controller 132, and the power supply controller 133 provided in the control section 130 will next be described.

The projection controller 131 controls the image processing section 125 to cause it to draw an image in the frame memory 126 on the basis of the image data supplied via the I/F section 124. The projection controller 131 further controls the image processing section 125 to cause it to draw an image in the frame memory 126 on the basis of the image data stored in the storage section 151. The projection controller 131 controls the light modulator drive section 123 to cause it to draw the images drawn in the frame memory 126 in the liquid crystal panels 112A of the light modulator 112. The images drawn in the liquid crystal panels 112A of the light modulator 112 are projected as a projection image on the screen SC via the projection system 113.

The communication controller 132 controls the communication section 156 to communicate with an external apparatus.

The power supply controller 133 monitors the state of the commercial AC power supply DG to which the power supply section 160 is connected and determines the commercial AC power supply DG to which the power supply section 160 is connected. That is, the power supply controller 133 monitors the power supply section 160 and determines whether the power supply section 160 is connected to the 200-V commercial AC power supply DG or the 100-V commercial AC power supply DG.

The projector 100 has the function of controlling the amount of first light outputted from the light source section 111 and uses the function to control the amount of light radiated to the screen SC. When executing the function of controlling the amount of first light, the projector 100 projects on the screen SC a menu screen for operation of specifying whether or not the function is allowed to be executed.

Figure 2:
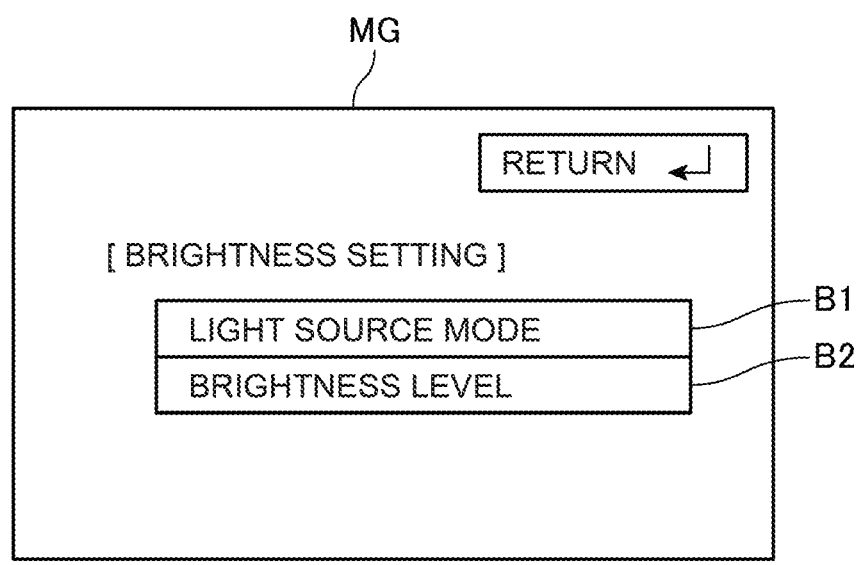
FIG. 2 shows an example of a menu screen.

FIG. 2 shows an example of a menu screen MG.

The menu screen MG shown in FIG. 2 has the following buttons selected by operation of the remote control, the operation panel 155, or any other component: a button B1, which specifies whether or not a light source mode is allowed to be activated; and a button B2, which specifies whether or not a brightness level is allowed to be set.

The light source mode has a setting mode for switching the brightness of the light to a value set in advance. The setting mode of the light source mode is formed of a plurality of setting modes. The user can select any of the setting modes of the light source mode to switch the brightness of the light radiated to the screen SC. When the user selects the button B1 and selects any of the setting modes of the light source mode, the projector 100 causes the light source section 111 to output the first light having an amount that achieves the light brightness indicated by the selected setting mode. For example, in a case where the light source section 111 is configured to have, as the light source, 20 LED arrays each of which is formed of a plurality of arranged LEDs, and the user switches the brightness of the light from a value to another by selecting a setting mode, the projector 100 controls the amount of first light emitted from each of the LED arrays.

The brightness level is the function of controlling the amount of first light outputted from the light source section 111 in such a way that the brightness of the light radiated to the screen SC is equal to the brightness of light set by the user. When the user selects the button B2, the projector 100 controls the amount of first light outputted from the light source section 111 in such a way that the brightness of the light radiated to the screen SC is equal to the brightness of light set by the user.

As described above, the power supply section 160 generates electric power that drives the projector 100 irrespective of the voltage of the commercial AC power supply DG to which the power supply section 160 is connected, 200 V or 100 V. In the case where the power supply section 160 is connected to the 100-V commercial AC power supply DG, the projector 100 restricts the function of controlling the brightness of the light radiated to the screen SC in some cases due to insufficient electric power supplied from 100-V the commercial AC power supply DG. That is, the projector 100 restricts the function of controlling the amount of first light outputted from the light source section 111 in some cases. In such cases, when the user who is not aware of the restriction instructs execution of the function, the following problem is likely to occur: The projector 100 does not execute the function of controlling the brightness of the light radiated to the screen SC irrespective of the instruction of execution of the function.

To avoid the problem, the projector 100 according to the present embodiment acts as described below.

The power supply controller 133 of the projector 100 determines whether or not the user has operated the operation panel 155, the remote control, or any other component to power on the projector 100 (step S1). When the power supply controller 133 determines that the projector 100 has been powered on (YES in step S1), the power supply controller 133 determines whether or not the power supply section 160 is connected to the 200-V commercial AC power supply DG (step S2).

In the case where the power supply controller 133 determined that the power supply section 160 is connected to the 200-V commercial AC power supply DG (YES in step S2), the control section 130 starts a normal action mode (step S3).

In the present embodiment, the normal action mode is a mode in which the light source drive section 122 controls the amount of first light outputted from the light source section 111 to be the amount in a first state or a second state that differs from the first state. The first state is, for example, the state of the amount of first light in a case where the light source section 111 has 20 LED arrays and the 20 LED arrays are turned on. The second state is a state different from the first state, as described above, for example, the state of the amount of first light in a case where eight of the 20 LED arrays are turned on.

In the present embodiment, the light source drive section 122 controls the amount of first light in such a way that the amount of first light in the first state is greater than the amount of first light in the second state. Therefore, in the case where the light source section 111 has a lamp, to output the first light in the first state, the light source drive section 122 controls the voltage outputted to the lamp in such a way that the amount of first light is greater than that in the second state.

The normal action mode is a mode that does not restrict the operation of controlling the amount of first light outputted from the light source section 111.

When the normal action mode starts, the projection controller 131 then controls the light source drive section 122 to turn on the light source in a turn-on state corresponding to the connection to the 200-V commercial AC power supply DG (step S4). The turn-on state corresponding to the connection to the 200-V commercial AC power supply DG may be the first or second state of the amount of first light. In the case of connection to the 200-V commercial AC power supply DG, the amount of first light may instead be so set as to be the amount in the first state instead of the second state. For example, in the case where the light source section 111 has 20 LED arrays, the projection controller 131 causes the light source drive section 122 to turn on the 20 LED arrays.

Further, the control section 130 accepts execution of the function of controlling the amount of first light outputted from the light source section 111 (step S4). That is, in the case where the power supply section 160 is connected to the 200-V commercial AC power supply DG, the projector 100 accepts operation that is performed on the menu screen MG and specifies whether or not the function of controlling the amount of first light is allowed to be executed. When the operation performed by the user is accepted, the control section 130 controls the amount of first light to be the amount in the first or second state in accordance with the accepted operation to control the brightness of the light radiated to the screen SC.

The projection controller 131 then turns on the light source in the turn-on state corresponding to the connection to the 200-V commercial AC power supply DG and starts projection (step S5).

On the other hand, when the power supply controller 133 determines that the power supply section 160 is not connected to the 200-V commercial AC power supply DG (NO in step S2), the power supply controller 133 determines whether or not the power supply section 160 is connected to the 100-V commercial AC power supply DG (step S6). When the power supply controller 133 determines that the power supply section 160 is not connected to the 100-V commercial AC power supply DG (NO in step S6), the control section 130 notifies that the projector 100 cannot normally act due to insufficient electric power supplied from the commercial AC power supply DG to which the power supply section 160 is connected (step S7). The control section 130 performs the notification by turning on the indicator lamp provided on the operation panel 155 or in any other aspect. As a result, the user can recognize that the projector 100 cannot act normally with the electric power supplied from the commercial AC power supply DG to which the projector 100 is connected.

On the other hand, when the power supply controller 133 determines that the power supply section 160 is connected to the 100-V commercial AC power supply DG (YES in step S6), the control section 130 starts a low voltage mode (step S8). In the present embodiment, the low voltage mode is a mode in which the light source drive section 122 controls the light source section 111 in such a way that the amount of first light outputted from the light source section 111 is the amount in the second state.

Further, the low voltage mode is a mode that restricts the operation of controlling the amount of first light outputted from the light source section 111. Specifically, the low voltage mode is a mode in which the operation of controlling the amount of first light is so limited as to be the amount in the second state.

When the low voltage mode starts, the control section 130 turns on the light source in a turn-on state corresponding to the connection to the 100-V commercial AC power supply DG (step S9). The turn-on state corresponding to the connection to the 100-V commercial AC power supply DG indicates that the amount of first light outputted from the light source section 111 is the amount in the second state. For example, in the case where the light source section 111 includes 20 LED arrays, the projection controller 131 turns on eight of the 20 LED arrays.

Further, the control section 130 does not accept the instruction of execution of the function of controlling the amount of first light outputted from the light source section 111 (step S9). That is, in the case where the power supply section 160 is connected to the 100-V commercial AC power supply DG, the control section 130 does not accept the operation that is performed on the menu screen MG and specifies whether or not the function of controlling the amount of first light is allowed to be executed. In the menu screen MG shown in FIG. 2, the control section 130 does not accept operation of selecting the button B1 or the button B2.

Further, in this case, the projection controller 131 projects the menu screen MG in an aspect different from the aspect in accordance with which the menu screen MG is projected in the case where the power supply section 160 is connected to the 200-V commercial AC power supply DG, for example, by graying out the menu screen MG.

As described above, since the operation that is performed on the menu screen MG and specifies whether or not the function is allowed to be executed is not accepted, the problematic situation in which the amount of light radiated to the screen SC cannot be controlled even when the user instructs execution of the function can be avoided. Further, since the menu screen MG is grayed out when the low voltage mode is activated, the user is notified that the function cannot be selected, whereby the probability of the user's recognition of inability to execute the function is increased.

The projection controller 131 then turns on the light source in the turn-on state corresponding to the connection to the 100-V commercial AC power supply DG (step S10). The projection controller 131 then projects information representing that the projector 100 is acting in the low voltage mode on the screen SC for a predetermined period (30 seconds, for example) after the projection section 110 starts projection. For example, the projection controller 131 projects information representing a message "Being driven in low voltage mode" for 30 seconds after the projection section 110 starts projection. The user can therefore recognize that the projector 100 is being driven with voltage lower than the normal voltage.

The information representing the message projected for a predetermined period after the projection section 110 starts projection is not limited to the information representing that the projector 100 is acting in the low voltage mode and may be information representing that selection of the function of controlling the brightness of the light is not accepted. The user can therefore recognize that the function of controlling the brightness of the light cannot be selected in the case where the projector 100 is connected to the 100-V commercial AC power supply DG.

As described above, the projector 100 according to the present embodiment includes the light source section 111, which outputs the first light, and the light modulator 112 (light modulation section), which outputs the second light, which is the first light modulated in accordance with image data (image information), and further includes the projection section 110, which projects the second light on the screen SC (projection surface). The projector 100 further includes the power supply section 160, which generates electric power that drives the projector 100 and generates the electric power in both a case where the power supply section 160 is connected to the commercial AC power supply DG (first power supply) having the voltage of 100 V (first power supply voltage) and a case where the power supply section 160 is connected to the commercial AC power supply DG (second power supply) having the voltage of 200 V (second power supply voltage). The projector 100 further includes the light source drive section 122, which controls the amount of first light outputted from the projection section 110. The projector 100 further includes the control section 130, which allows execution of the function of controlling the amount of first light from the light source section 111 in the case where the power supply section 160 is connected to the 200-V commercial AC power supply DG and restricts the execution of the function in the case where the power supply section 160 is connected to the 100-V commercial AC power supply DG.

As described above, since the amount of first light is controlled differently in the case where the power supply section 160 is connected to the 200-V commercial AC power supply DG and the case where the power supply section 160 is connected to the 100-V commercial AC power supply DG, the function of controlling the amount of outputted first light can be executed in accordance with the commercial AC power supply DG to which the power supply section 160 is connected.

The projection controller 131 causes the projection section 110 to project a displayed content indicating that selection of the function of controlling the amount of outputted first light is not accepted in the case where the power supply section 160 is connected to the 100-V commercial AC power supply DG. In the present embodiment, the projection controller 131 causes the projection section 110 to project the menu screen MG in an aspect different from the aspect in accordance with which the menu screen MG is projected in the case where the power supply section 160 is connected to the 200-V commercial AC power supply DG, for example, by graying out the menu screen MG.

As described above, since the menu screen MG indicating that selection of the function of controlling the amount of outputted first light is not accepted is projected in an aspect different from the aspect in accordance with which the menu screen MG that accepts selection of the function is projected, the user can be notified that the function cannot be selected.

Further, since the menu screen MG is grayed out, the probability of the user's recognition of inability to execute the function is increased.

Further, the projection controller 131 causes the projection section 110 to project information representing that selection of the function of controlling amount of outputted first light is not accepted for a predetermined period after the projection section 110 starts projection.

As described above, since the information representing that selection of the function of controlling the amount of outputted first light is not accepted is projected for a predetermined period after the projection section 110 starts projection, the user can be notified that the function cannot be selected. The user who looks at the notification can then recognize that the user cannot select the function of controlling the amount of outputted first light. That is, the user can recognize that the brightness of the light radiated to the screen SC cannot be controlled.

Further, the projection controller 131 causes the projection section 110 to project the menu screen MG for the operation of specifying whether or not the function of controlling the amount of outputted first light is allowed to be executed. In the case where the power supply section 160 is connected to the 100-V commercial AC power supply DG, the control section 130 does not accept operation that is performed on the menu screen MG and specifies whether or not the function is allowed to be executed.

As described above, since the operation that is performed on the menu screen MG and specifies whether or not the function is allowed to be executed is not accepted, the problematic situation in which the amount of outputted first light cannot be controlled even when the user instructs execution of the function can be avoided.

Further, the light source drive section 122 uses the function of controlling the amount of outputted first light to control the amount of first light to be the amount in the first state or the second state different from the first state. The light source drive section 122 controls the amount of first light to be the amount in the first or second state set by operation performed on the menu screen MG in the case where the power supply section 160 is connected to the 200-V commercial AC power supply DG and controls the amount of first light to be the amount in the second state in the case where the power supply section 160 is connected to the 100-V commercial AC power supply DG.

As a result, in the case where the power supply section 160 is connected to the 200-V commercial AC power supply DG, the amount of first light is controlled to be the amount in the first or second state, and in the case where the power supply section 160 is connected to the 100-V commercial AC power supply DG, the amount of first light is controlled to the amount in the second state. The function of controlling the amount of outputted first light can therefore be executed in accordance with the commercial AC power supply DG to which the power supply section 160 is connected.

Variation

A variation will next be described.

The variation will be described with reference to a multi-projection system. The multi-projection system is a system in which a plurality of projectors 100 are provided and arranged in a certain pattern and images projected by the plurality of projectors 100 are combined with one another and displayed as a single tiled image.

Each of the projectors 100 provided in the multi-projection system uses the function of controlling the amount of first light outputted from the light source section 111 to execute projection image adjustment, such as black level correction, color unevenness correction, and color tone correction.

Among the projectors 100 provided in the multi-projection system, a projector 100 that projects a projection image that is the target of the adjustment (hereinafter referred to as target projector) accepts operation of specifying whether or not the projection image adjustment is allowed to be executed in the case where the power supply section 160 is connected to the 200-V commercial AC power supply DG. In this case, the target projector projects on the projection target the menu screen MG for the operation of specifying whether or not the projection image adjustment is allowed to be executed. The target projector then executes the projection image adjustment on the basis of the user's operation performed on the menu screen MG.

On the other hand, in the case where the power supply section 160 is connected to the 100-V commercial AC power supply DG, the target projector does not accept the operation. That is, the target projector does not accept operation performed on the menu screen MG for the operation of specifying whether or not the projection image adjustment is allowed to be executed.

Figure 4:
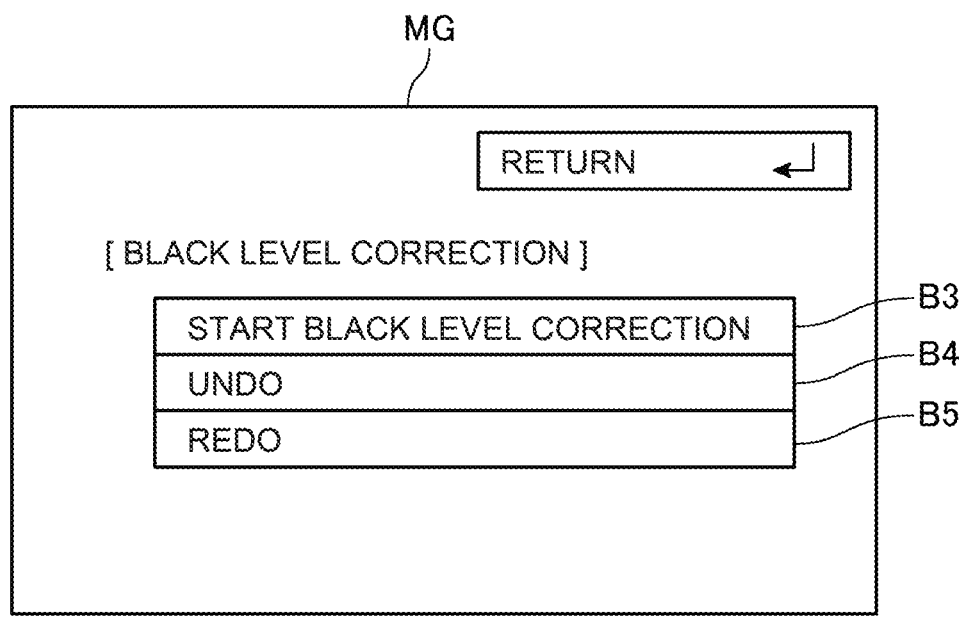
FIG. 4 shows an example of a menu screen in a variation.

FIG. 4 is a diagram showing an example of the menu screen MG and shows a menu screen MG for operation of specifying whether or not a black-level-correction-related process is allowed to be carried out.

In the example of the menu screen MG shown in FIG. 4, a plurality of buttons B3 to B5 are provided. The user operates the remote control, the operation panel 155, or any other component to select any of the buttons B3 to B5 and specifies whether or not the black-level-correction-related process on a projection image is allowed to be carried out.

In the case where the power supply section 160 is connected to the 200-V commercial AC power supply DG, the target projector accepts operation of selecting any of the buttons B3 to B5 provided in the menu screen MG shown in FIG. 4. When the user's operation is accepted, the light source drive section 122 controls the light source section 111 in accordance with the selected button, and the target projector carries out the black-level-correction-related process.

On the other hand, in the case where the power supply section 160 is connected to the 100-V commercial AC power supply DG, the target projector does not accept operation performed on any of the buttons B3 to B5 provided in the menu screen MG shown in FIG. 4. Further, the target projector projects the menu screen MG in an aspect different from the aspect in accordance with which the menu screen MG is projected in the case where the power supply section 160 is connected to the 200-V commercial AC power supply DG, for example, by graying out the menu screen MG. As described above, since the operation that is performed on the menu screen MG and specifies whether or not execution of the function is allowed to be executed is not accepted, a problematic situation in which a projection image cannot be adjusted even when the user instructs execution of the projection image adjustment can be avoided. Further, since the menu screen MG is projected in, for example, an aspect in which the menu screen MG is grayed out, which is an aspect different from the aspect in accordance with which the menu screen MG is projected in the case where the power supply section 160 is connected to the 200-V commercial AC power supply DG, the target projector can notify that it cannot instruct execution of the projection image adjustment. In the example of the menu screen MG shown in FIG. 4, the user can be notified that the black-level-correction-related process cannot be carried out.

Each of the embodiment and the variation described above is an example of a preferable embodiment of the invention, and a variety of variations are conceivable to the extent that they do not depart from the substance of the invention.

For example, the embodiment described above has been illustrated with reference to the configuration in which the control section 130 does not accept the operation that is performed on the menu screen MG and specifies whether or not the function is allowed to be executed in the case where the power supply section 160 of the projector 100 is connected to the 100-V commercial AC power supply DG. The configuration is not necessarily employed, and a configuration in which operation for transition to the menu screen MG is not accepted may be employed. Similarly, a configuration in which the control section 130 of the target projector in the multi-projection system does not accept operation for transition to the menu screen MG may be employed.

Further, for example, the projector 100 described above may be a front-projection projector that performs projection from the side in front of the screen SC or a rear-projection projector that performs projection from the side behind the screen SC.

Figure 3:
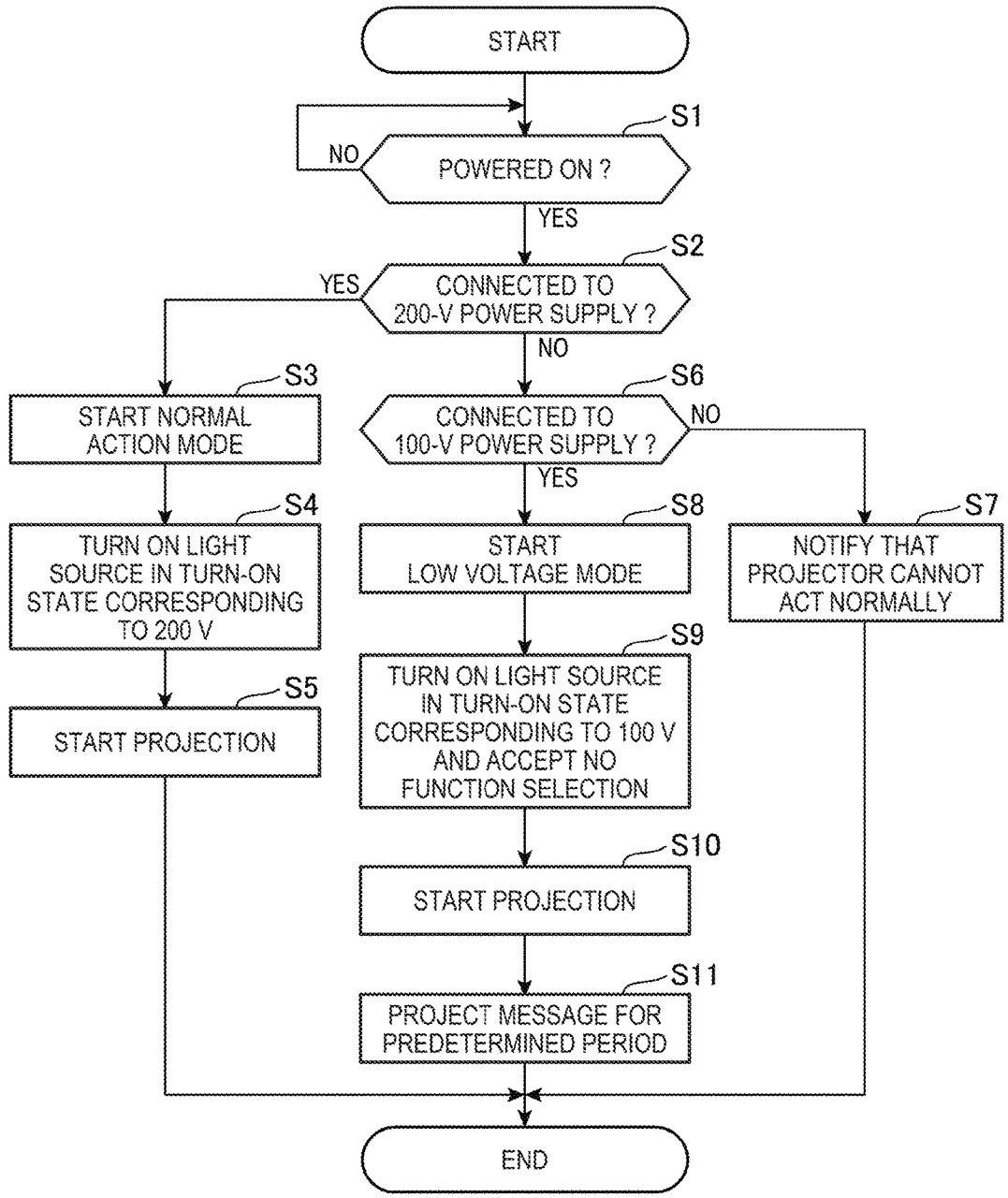
FIG. 3 is a flowchart showing the action of the projector.

Further, for example, the process units in FIG. 3 are presented for easy understanding of the process carried out by the projector 100 and obtained by dividing the process in accordance with primary process contents, and how to divide the process into process units and the name thereof do not limit the invention. The process carried out by the projector 100 may be divided into a greater number of process units in accordance with process contents. Further, the division may be so performed that one process unit contains a greater number of sub-processes.

Each of the functional portions shown in FIG. 1 represents a functional configuration and is not necessarily implemented in a specific form. That is, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software. In addition, the specific detailed configuration of each of the other portions in the projector 100 can be arbitrarily changed to the extent that the change does not depart from the substance of the invention.

What is claimed is:

1. A projector comprising:
    a projection section that includes a light source section that outputs first light and a light modulation section that outputs second light that is the first light modulated in accordance with image information, the projection section projecting the second light on a projection surface;
    a power supply section that generates electric power that drives the projector and generates the electric power in both a case where the power supply section is connected to a first power supply having first power supply voltage and a case where the power supply section is connected to a second power supply having second power supply voltage lower than the first power supply voltage;
    a light source drive section that controls an amount of the first light outputted from the light source section; and
    a control section that allows execution of a function of controlling the amount of the first light from the light source section in the case where the power supply section is connected to the first power supply and restricts the execution of the function in the case where the power supply section is connected to the second power supply,
    wherein the control section causes the projection section to project a displayed content indicating that selection of the function is not accepted in the case where the power supply section is connected to the second power supply.

2. The projector according to claim 1,
    wherein the control section causes the projection section to project information representing that selection of the function is not accepted for a predetermined period after the projection section starts projection.

3. The projector according to claim 1,
    wherein the control section causes the projection section to project a menu screen for operation of specifying whether or not the function is allowed to be executed, and
    in the case where the power supply section is connected to the second power supply, the control section does not accept the operation that is performed on the menu screen and specifies whether or not the function is allowed to be executed.

4. The projector according to claim 3,
    wherein the light source drive section
    uses the function to control the amount of the first light to be the amount in a first state or the amount in a second state different from the first state,
    controls the amount of the first light to be the amount in the first state or the second state set by operation performed on the menu screen in the case where the power supply section is connected to the first power supply, and
    controls the amount of the first light to be the amount in the second state in the case where the power supply section is connected to the second power supply.

5. A method for controlling a projector including a projection section that includes a light source section that outputs first light and a light modulation section that outputs second light that is the first light modulated in accordance with image information, the projection section projecting the second light on a projection surface, and a power supply section that generates electric power that drives the projector and generates the electric power in both a case where the power supply section is connected to a first power supply having first power supply voltage and a case where the power supply section is connected to a second power supply having second power supply voltage lower than the first power supply voltage, the method comprising:
    controlling an amount of the first light outputted from the light source section; and
    allowing execution of a function of controlling the amount of the first light from the light source section in the case where the power supply section is connected to the first power supply and restricting the execution of the function in the case where the power supply section is connected to the second power supply,
    wherein the projection section projects a displayed content indicating that selection of the function is not accepted in the case where the power supply section is connected to the second power supply.

* * * * *